United States Patent [19]
Dauwalder

[11] 3,978,935
[45] Sept. 7, 1976

[54] FINAL DRIVE BEARING ARRANGEMENT

[75] Inventor: Fred R. Dauwalder, Aurora, Ill.

[73] Assignee: Caterpillar Tractor Co., Peoria, Ill.

[22] Filed: Aug. 27, 1975

[21] Appl. No.: 608,295

[52] U.S. Cl. .................................. 180/9.62; 74/801
[51] Int. Cl.² ......................................... B62D 55/12
[58] Field of Search ............. 180/9.62; 74/801, 802

[56] References Cited
UNITED STATES PATENTS

| | | | |
|---|---|---|---|
| 2,702,603 | 2/1955 | Risk | 180/9.62 |
| 2,939,346 | 6/1960 | McCarthy | 74/801 |

Primary Examiner—Philip Goodman
Attorney, Agent, or Firm—Oscar G. Pence

[57] ABSTRACT

A final drive bearing arrangement is provided for rotatably mounting a sprocket carrying hub about a nonrotatable sprocket shaft for a final drive assembly of a crawler tractor. The bearing arrangement includes an annular bearing cage for mounting a tapered roller bearing on the outer end of the hub and has an inner sleeve portion positionable in closely slidable relation about a cylindrical portion on the sprocket shaft adjacent its distal end. A nut screw threadably mounted on the distal end of the shaft is effective in securing the cage thereon and in adjustably exerting a predetermined axial preloading force on the bearing through the cage to obtain the maximum life from the bearing.

9 Claims, 3 Drawing Figures

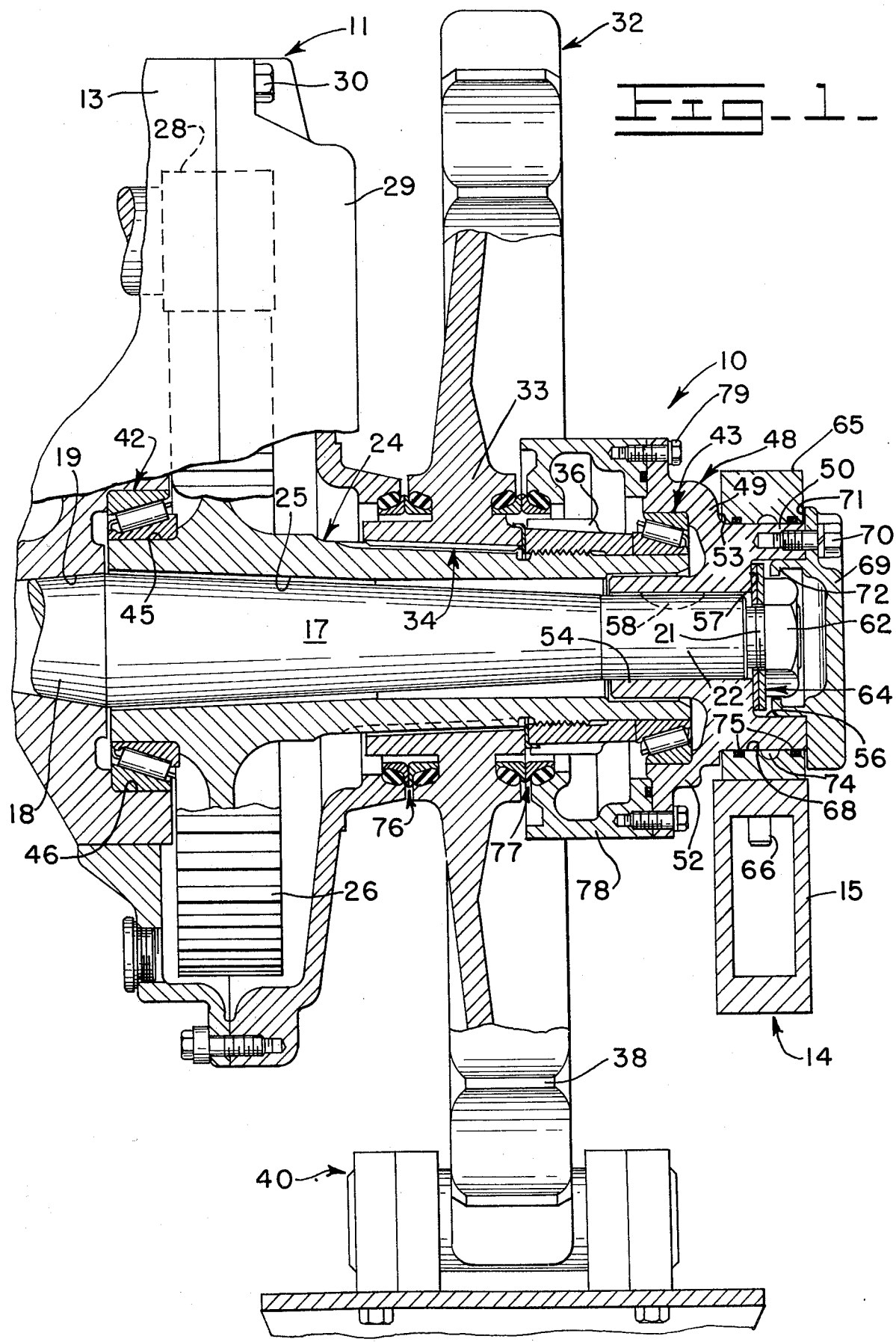

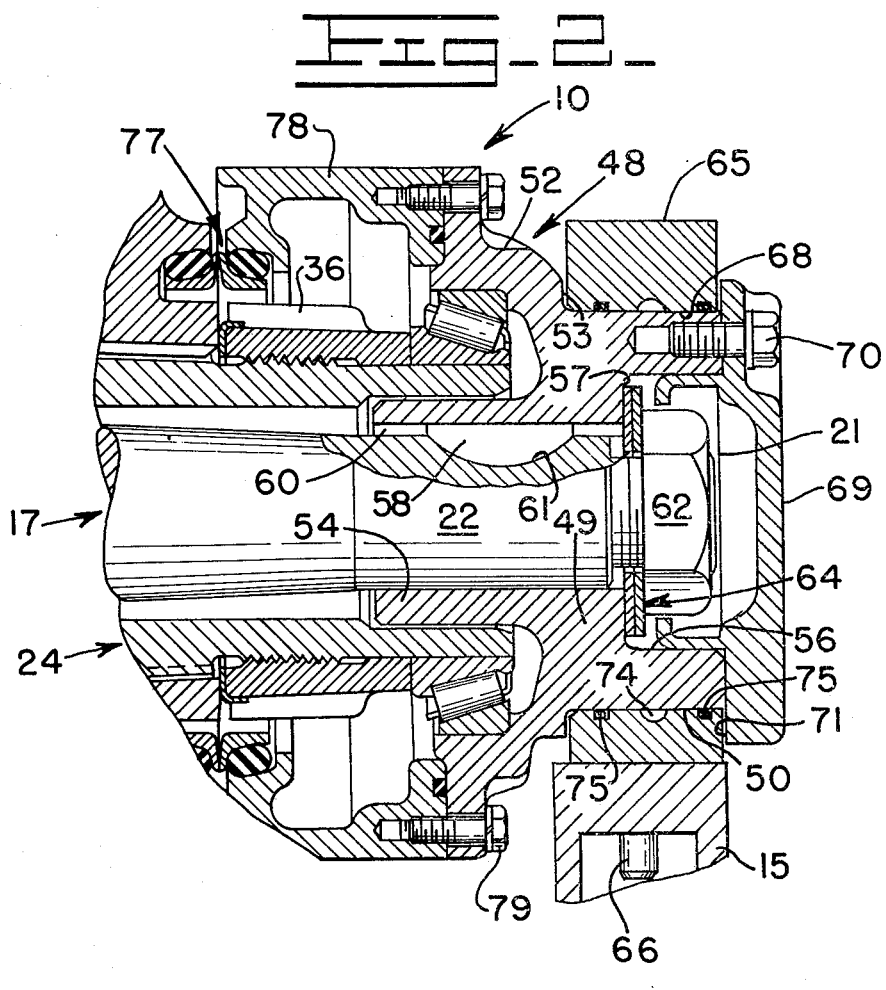
Fig_2_
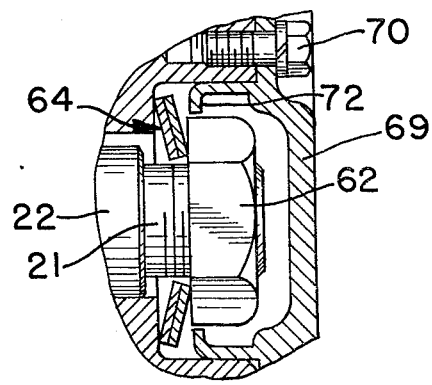
Fig_3_

3,978,935

FINAL DRIVE BEARING ARRANGEMENT

BACKGROUND OF THE INVENTION

This invention relates generally to a final drive assembly for a crawler tractor and more particularly to a bearing arrangement used in conjunction therewith for rotatably mounting a quill shaft or hub about a nonrotatable sprocket shaft.

In the past, it has been common practice to mount a track driving sprocket on a quill shaft which also mounts a bull gear driven through a gear reduction of the final drive assembly powered by the tractor. The quill shaft is normally supported for rotation about a rigid, nonrotatable sprocket shaft which is mounted in cantilevered relation from a bevel gear and steering clutch case of the tractor.

The present invention is particularly concerned with the problem of adjusting the sprocket hub mounting bearings which has heretofore been accomplished by a relatively large diameter nut which is disposed about the quill shaft between the sprocket and the track frame of the tractor. In practice, the track chain which is wrapped about the sprocket and disposed in closely surrounding relation above, below and to the rear of the nut and the track frame which is disposed in front thereof makes access to the nut for adjustment purposes by the use of a relatively long spanner wrench extremely difficult. The adjustment of the bearing preload is further hindered by the relatively large force necessary to turn the nut due to the relatively large number of components through which the force must be transmitted and the large thread diameter of the nut itself which cause large frictional losses to occur.

For instance, the adjustment nut of a comparable final drive specifies a tightening torque of from 900–1200 ft. lbs (124.47–165.96 kilograms-meters) be applied thereto to provide an axial preloading force on the bearings of approximately 8500–11,000 lbs (3,855.6–4,989.6 kg).

Another problem typically found in prior art bearing mounting configurations is that the bearing cages employed therein are normally fixed in axial relation relative to the sprocket shaft which effects the axial position of the sprocket relative to the track frame and necessitates the use of shims in order to properly align the sprocket with the associated track mounted by such track frame.

OBJECTS OF THE INVENTION

Accordingly, an object of this invention is to provide an improved final drive bearing arrangement for rotatably mounting a sprocket carrying hub about a nonrotatable sprocket shaft for a final drive assembly of a crawler tractor which arrangement is easily accessible for adjustment purposes and utilizes a minimum number of noncomplex components.

Another object of this invention is to provide a bearing arrangement of the type described which greatly facilitates the necessary adjusting of the bearing preload along with reducing the time and effort required to effect such adjustment.

Another object of this invention is to provide such bearing arrangement whose bearing cage is substantially axially fixed relative to the track frame and movable relative to the sprocket shaft so as to enable the elimination of the use of shims for aligning the sprocket with the track of the tractor.

Other objects and advantages of the present invention will become more readily apparent upon reference to the accompanying drawings and following description.

BRIEF DESCRIPTION OF THE DRAWINGS

FIG. 1 is a sectional view in a vertical plane transversely of the sprocket showing the improved bearing arrangement of the present invention as applied to the final drive mechanism disclosed.

FIG. 2 is an enlarged fragmentary sectional view of a portion of FIG. 1.

FIG. 3 is an enlarged sectional view of a portion of FIG. 2.

DESCRIPTION OF THE PREFERRED EMBODIMENT

Referring more particularly to the drawings, an improved bearing arrangement is generally indicated at 10 in FIG. 1 for use in association with a final drive assembly 11 of a crawler tractor, not shown. The crawler tractor includes a bevel gear and steering clutch case partially shown at 13 and a laterally spaced truck frame 14 having an outer rail member shown at 15. While not intended to be limited to such, the track frame is preferably of the nonoscillating type, such as commonly used for a crawler-type loader vehicle.

The final drive assembly 11 includes a nonrotatable sprocket shaft 17 having a tapered inner end portion 18 fixedly secured in a tapered bore 19 of the bevel gear case in any suitable manner, such as by a nut, not shown. Thus, the sprocket shaft extends in cantilevered relation from the bevel gear case and is provided with a reduced diameter distal end portion 21 disposed adjacent the outer rail member 15 of the track frame and an outer cylindrical portion 22 adjacent the distal end.

An elongated hub or quill 24 has a bore 25 sized for positioning the hub in spaced coaxial relation about the sprocket shaft 17. The hub carries a bull gear 26 which is driven by a suitable gear reduction, such as an input pinion at 28, which in turn is driven by a suitable power surce, not shown. The gears are enclosed in a suitable housing 29 which may be secured to the case 13 by threaded means, such as bolts 30.

A track driving sprocket 32 is also carried by the hub and has an inner hub portion 33 for mounting the sprocket onto the hub by means of a tapered spline connection at 34. A lock nut 36 is screw threadably mounted on the hub in axial bearing engagement against the hub portion 33 of the sprocket to prevent the sprocket from loosening during operation. The sprocket 32 has teeth 38 for driving engagement with an endless track chain 40, in the usual manner.

The bearing arrangement 10 to which the present invention more closely pertains includes a pair of inner and outer tapered roller bearings 42 and 43 for rotatably mounting the hub 24 in coaxial relation about te sprocket shaft 17. The inner bearing 42 is suitably mounted on the inner end of the hub in a recess 45 provided therein and in a suitable complimentary recess 46 in the case 13. The outer bearing 43 is mounted about the outer end of the hub and in axially abutting relation against the outer end of the lock nut 36.

The outer bearing 43, as best shown in FIG. 2, is mounted by an annular bearing cage 48 having a generally tubular body 49. The outer periphery of the body defines a reduced diameter cylindrical outer end portion 50 and an adjacent inner flange portion 52 providing a radial shoulder 53 therebetween. The inner periphery of the body defines an inner sleeve portion 54 and an adjacent outer enlarged nut receiving recess 56, also providing a radial shoulder 57 therebetween. The inner sleeve portion is sized for close radial supporting receipt on the outer cylindrical portion 22 of the sprocket shaft 17. The cage is nonrotatably, axially movably connected to the shaft by key means, such as a Woodruff key 58 which is mounted within a suitable axial slot 60 provided in the sleeve portion 54 and a complimentary arcuate slot 61 in the cylindrical portion of the shaft. Thus, the bearing cage 48 may be moved axially relative to the shaft to permit the adjustment of the preload of the bearings 42 and 43 in a manner hereinafter described.

A nut 62 positionable within the recess 56 of the cage 48 is screw threadably mounted on the distal end 21 of the sprocket shaft 17 for securing the bearing cage thereon and for adjustably applying an axial preloading force on the bearings through the cage. Such axial force is preferably transmitted into the shoulder 57 of the bearing cage through an axial force storing device, such as a pair of Bellville-type spring washers 64, disposed therebetween. Thus, by applying a predetermined torque on the nut 62, a proper amount of preload can be applied to the bearings so that the maximum design life may be obtained from the bearings.

The bearing cage is connected to the outer rail member 15 of the track frame by an outer support 65 fixedly secured to the rail member 15, such as by dowels 66. The outer support is provided with a bore 68 therethrough for receiving the cylindrical outer end portion 50 of the bearing cage 48. A flanged retainer 69 is mounted on the outer end portion 50 of the bearing cage by bolts 70 and defines a radially extending shoulder 71 for securing the cap to the support so that the cage is positioned in a substantially fixed axial relation relative to the track frame. It is to be understood that the track 40 is mounted about the track frame 14 in a predetermined fixed relation thereto in any suitable manner well known in the art. The sprocket 32, in turn, is also mounted in relatively precisely controlled axial relation relative to the track frame through the lock nut 36, bearing 43, bearing cage 48 and outer support 65. Because of the independent axial relation of the bearing cage relative to the sprocket shaft 17, as mentioned earlier, the sprocket is thus positioned in its proper driving alignment with the track 40 without the use of shims. As shown in the drawings, however, a slight gap is preferably provided between the opposite sides of the outer support 65 and the shoulder 53 of the bearing cage and the retainer 69 to permit a limited amount of lateral shifting movement of the bearing cage therein so as to minimize any bending loads on the cage due to any heavy loads which may be exerted on the track frame from time to time during operation. The cylindrical nature of the connection between cage and the support permits slight oscillatory movement therebetween so as to alleviate the transmission of any torsional loads therebetween. To facilitate such oscillation, lubricant is preferably provided in an annular cavity 74 in the support for lubricating the mating cylindrical surfaces of the support and bearing cage. A pair of seals are provided at 75 for the usual sealing purposes.

The retainer 69 also closes the recess 56 in which the nut 62 is disposed to provide a protective cover therefor and has a plurality of lock tabs 72 integrally formed thereon for engagement with the nut to prevent loosening of such nut during subsequent operation.

A pair of Duo-cone seals 76,77 may be provided for sealing the final drive assembly on the opposite sides of the sprocket 32. In this regard, the seal 76 is positioned in suitable complimentary grooves provided in the final drive housing 29 and the adjacent hub portion 33 of the sprocket. The seal 77 is similarly disposed in suitable grooves in the other side of the sprocket hub and a seal retainer 78. The retainer is preferably secured to the inner flange portion 52 of the bearing cage by bolts 79. However, such retainer could be provided integrally on the cage as well.

OPERATION

While the operation of the present invention is believed clearly apparent from the foregoing description, further amplification will be subsequently made in the following brief summary of such operation. In use, the desired preload of the bearings 42 and 43 is effected, as discussed above, by suitable wrenching of the nut 62 onto the distal end 21 of the sprocket shaft whereby the bearing cage is urged axially inwardly so as to bear against the bearing 43. This is effective in applying a suitable preload on the bearing. Such force is simultaneously applied on the inner bearing through the transmission of such force through the lock nut 36 and hub 24.

To obtain access to the nut for adjusting the preload on the bearings, it is necessary merely to move the protective cover or retainer 69 through the removal of bolts 70. As the nut is at the distal end of the sprocket shaft, it is easily accessible from the exterior of the tractor for wrenching purposes, instead of being positioned on the inside of the rail 15 of the track frame where the frame and the track chain combine to substantially surround the adjustment nuts of prior art final drive constructions. Also because of the relatively small diameter size of the threads of the nut 62, less torque is required for turning the nut because of lower losses due to friction. Less effort is also required to turn the nut because the nut bears directly against the bearing cage, instead of the tightening force having to be transmitted through numerous other components which also cause high frictional losses.

In the particular final drive assembly illustrated, the desired axial preload for the bearings is approximately from 19,000 – 24,000 lbs. (8,8618.4 – 10,886.4 kg.). In the present bearing arrangement, the torque required to achieve this preload is only approximately 400 – 500 ft.-lbs (55.32 – 69.15 kg.-m), rather than the 900 – 1200 ft-lbs (124.47 – 165.96 kg-m) of torque necessary to achieve only the 8500 – 11,000 lbs (3,855.6 – 4,989.6 kg.) preload force on the bearings of the previously mentioned prior art final drive. Thus, the present bearing arrangement is effective in achieving a substantially greater preload with a substantially lesser torque on the adjustment nut. It should be understood that the particular bearing preloads mentioned herein are merely for illustrative purposes and the present invention is not intended to be limited thereby, as those skilled in the art will appreciate that such preload is dependent upon many design parameters of the structure in which the bearings are employed and the particular operating conditions to be encountered.

The present invention also advantageously uses the Bellville-type spring washers 64 between the nut and the bearing cage so as to automatically retain the preload on the bearings for a greater period of time which might otherwise be lost due to wear or permanent set of the various components involved. Thus, less frequent adjustment of the nut 62 is required to extend the time between required service intervals.

While the present invention has been described and shown with particular reference to the preferred embodiment, it will be apparent that variations might be possible that would fall within the scope of the present invention, which is not intended to be limited except as defined in the following claims.

What is claimed is:

1. In a crawler tractor having a case, a track frame disposed in laterally spaced relation to said case, and a final drive assembly mounted to the case and having a nonrotatable sprocket shaft extending laterally between the case and the track frame, a track driving sprocket and an elongated hub carrying such sprocket, a bearing arrangement wherein the improvement comprises;
   a pair of tapered roller bearings for rotatably mounting the hub in spaced coaxial relation about said sprocket shaft with one of said bearings being mounted between said case and the adjacent inner end of said hub and the other of said bearings being mounted on the outer end of said hub;
   a threaded distal end portion on said shaft adjacent said track frame;
   a cylindrical portion on said shaft adjacent said distal end portion;
   an annular bearing cage for supporting said outer bearing, said bearing cage including an inner sleeve portion positioned in close radially supporting relation about said cylindrical portion of the shaft, said sleeve and cylindrical portions being cooperatively uniformly sized to permit sliding movement of the bearing cage along the shaft for providing an axial floating relationship therebetween; and
   a nut adjustably screw threadably mounted on said distal end portion of the shaft in axial engagement against said bearing cage , said nut being selectively screw threadably tightened against said bearing cage to apply a predetermined axial load thereto, which axial load, due to the axial mobility of the cage relative to the shaft, is freely transmitted through the cage for applying a predetermined axial preload on said bearings.

2. The bearing arrangement of claim 1 including mounting means for interconnecting said bearing cage in substantially fixed axial relation to said track frame so that said sprocket is positionable in predetermined controlled alignment with respect to said track without shimming.

3. The bearing arrangement of claim 2 wherein said mounting means includes an outer support fixedly secured to said track frame having a bore therethrough concentric to said sprocket shaft, a cooperative cylindrical portion provided on said bearing cage positionable within said bore for permitting limited pivotal movement therebetween, and a pair of axially spaced shoulders disposed in slightly spaced relation from the opposite sides of said outer support for allowing limited axial movement of the track frame therebetween so as to minimize the transmission of any torsional and axial loads from the track frame into the bearing cage.

4. The bearing arrangement of claim 3 wherein said mounting means includes a retainer detachably mounted to the outer end of the cylindrical portion of said bearing cage defining one of said shoulders and forming a protective cover for said nut.

5. The bearing arrangement of claim 4 wherein said retainer includes lock means integrally formed thereon and engageable with said nut to prevent its loosening during subsequent operation.

6. The bearing arrangement of claim 2 including key means operatively interconnected between said sprocket shaft and said bearing cage for preventing relative rotation therebetween.

7. The bearing arrangement of claim 6 wherein said key means includes a Woodruff key mounted in a pair of axial disposed slots cooperatively formed in said cylindrical portion of the sprocket shaft and the sleeve portion of the bearing cage to permit axial movement of the bearing cage along said shaft.

8. The bearing arrangement of claim 1 wherein said bearing cage is provided with an annular shoulder adjacent the distal end of said shaft and wherein the arrangement includes axial force storing means disposed between the nut and said shoulder of the bearing cage for automatically retaining the desired axial preload on said bearings so as to reduce the frequency of the adjustments of said nut necessary to maintain such preload.

9. The bearing arrangement of claim 8 wherein said axial force storing means is provided by a pair of Bellville-type washers.

* * * * *